United States Patent [19]

Turner

[11] Patent Number: 5,190,208
[45] Date of Patent: Mar. 2, 1993

[54] FOAMING FLUX FOR AUTOMATIC SOLDERING PROCESS

[75] Inventor: Raymond L. Turner, La Habra, Calif.

[73] Assignee: Hughes Aircraft Company, Los Angeles, Calif.

[21] Appl. No.: 780,170

[22] Filed: Oct. 21, 1991

Related U.S. Application Data

[60] Continuation-in-part of Ser. No. 705,858, May 28, 1991, abandoned, which is a division of Ser. No. 607,200, Oct. 31, 1990, abandoned, which is a continuation-in-part of Ser. No. 523,765, May 15, 1990, Pat. No. 5,085,365.

[51] Int. Cl.$^5$ .............................................. B23K 1/20
[52] U.S. Cl. .................................. 228/207; 228/123; 148/23
[58] Field of Search ............... 228/223, 180.1, 207; 148/23

[56] References Cited

U.S. PATENT DOCUMENTS

| | | | |
|---|---|---|---|
| 1,402,644 | 1/1922 | Passalacqua | 148/23 |
| 1,805,458 | 5/1931 | Rogers | 106/244 |
| 2,470,957 | 5/1949 | Stader | 148/23 X |
| 3,020,635 | 2/1962 | Redgrift | 228/223 |
| 3,091,029 | 5/1963 | Davis | 228/224 |
| 3,162,547 | 12/1964 | Kendall | 134/3 |
| 3,220,892 | 11/1965 | Durham, Jr. | 148/23 |
| 3,305,406 | 2/1967 | Chmelick et al. | 148/23 |
| 3,684,533 | 8/1972 | Conwicke | 148/24 |
| 3,723,191 | 3/1973 | Bos et al. | 148/23 |
| 3,895,973 | 7/1975 | Stayner | 148/23 X |
| 3,925,112 | 12/1975 | Petersen et al. | 148/25 |
| 3,966,632 | 6/1976 | Colliopoulos et al. | 106/244 |
| 4,073,412 | 2/1978 | Doumani | 106/244 |
| 4,113,525 | 9/1978 | Stayner | 148/23 |
| 4,290,824 | 9/1981 | Cole | 148/23 |
| 4,342,606 | 8/1982 | Notton | 148/23 |
| 4,342,607 | 8/1982 | Zado | 148/23 |
| 4,460,427 | 7/1984 | Haney et al. | 427/98 |
| 4,478,650 | 10/1984 | Zado | 148/23 |
| 4,568,395 | 2/1986 | Nabhani | 148/23 |
| 4,708,281 | 11/1987 | Nelson et al. | 228/223 X |
| 4,738,732 | 4/1988 | Anderson et al. | 148/23 |
| 4,759,490 | 7/1988 | Ochiai | 148/24 |
| 4,762,573 | 8/1988 | Biverstedt | 228/223 X |
| 4,809,901 | 3/1989 | Gen et al. | 148/23 |
| 4,821,948 | 4/1989 | Fisher et al. | 228/223 |
| 4,872,928 | 10/1989 | Jacobs | 148/24 |
| 4,895,606 | 1/1990 | Jafri | 148/25 |
| 5,085,365 | 2/1992 | Turner | 228/223 |

FOREIGN PATENT DOCUMENTS

| | | |
|---|---|---|
| 090960 | 3/1983 | European Pat. Off. |
| 2052713 | 10/1970 | Fed. Rep. of Germany |
| 104106 | 3/1922 | France |
| 460965 | 4/1975 | U.S.S.R. ............... 148/23 |
| 2080341 | 7/1980 | United Kingdom |
| 8703783 | 7/1987 | World Int. Prop. O. ........... 106/244 |

OTHER PUBLICATIONS

Weast, R. C., "CRC Handbook of Chemistry and Physics", CRC Press, Inc., Boca Raton, Fla., 1984; pp. D-222, D-229.
Patent Abstracts of Japan, vol. 11, No. 175 (M-596) [2622], 5th Jun. 1987; & unexamined Japanese Patent Publication No. 62-6796 (including tanslation).
Soviet Inventions Illustrated, week 8747, 2nd Dec. 1987, abstract No. 333423, Derwent Publications Ltd., London, GB; & SU-A-1 303 341 (A. I. Bulatov) Apr. 15, 1987 (including translation).

Primary Examiner—Kenneth J. Ramsey
Attorney, Agent, or Firm—William C. Daubenspeck; Wanda K. Denson-Low

[57] ABSTRACT

A non-toxic, non-corrosive foaming soldering flux (14) comprises citric acid and water, together with at least one foaming agent. The foam is fast-breaking, dissipating almost immediately. Such a fast-breaking foam is novel in an aqueous-based flux. The unique flux of the invention produces solder joints of high metallic luster and excellent quality. Disposal presents no health hazads, and clean-up of flux residues is accomplished using only water and, optionally, a surfactant.

40 Claims, 2 Drawing Sheets

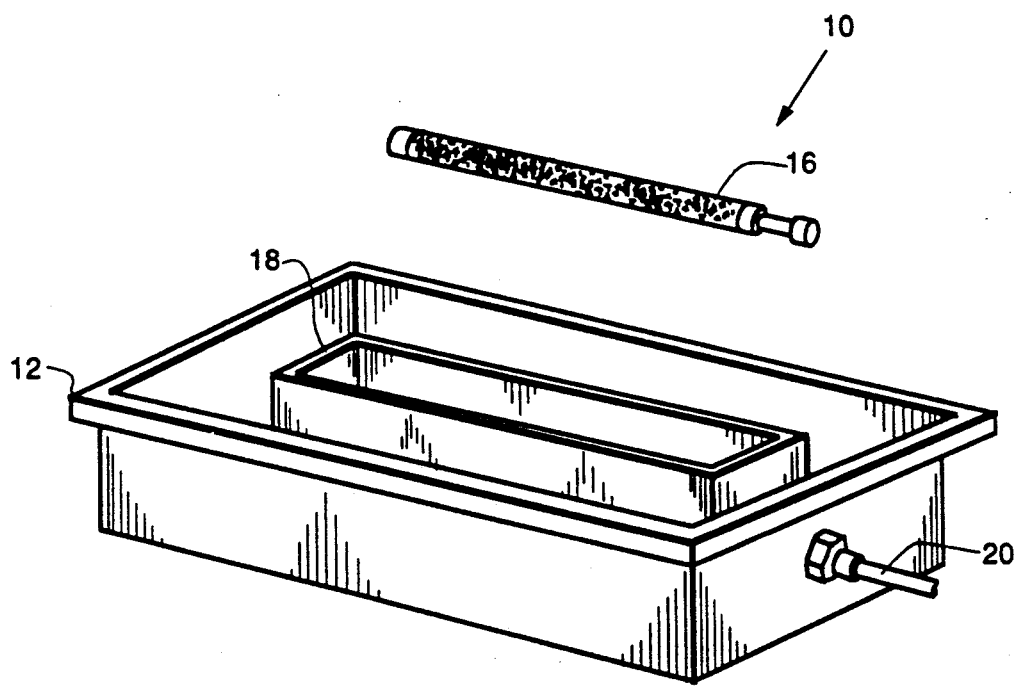
FIG. 1.
FIG. 2.
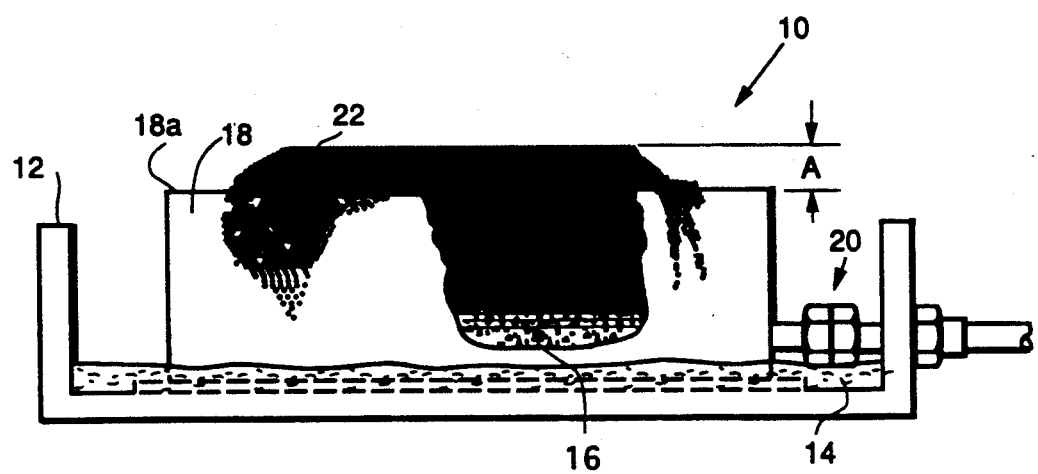

FOAMING FLUX FOR AUTOMATIC SOLDERING PROCESS

CROSS-REFERENCE TO RELATED APPLICATION

The present application is a continuation-in-part of Ser. No. 07/705,858, filed May 28, 1991, now abandoned, which in turn is a divisional application of Ser. No. 07/607,200, filed Oct. 31, 1990, now abandoned which in turn is a continuation-in-part of Ser. No. 07/523,765, filed May 15, 1990, is U.S. Pat. No. 3,085,365. The present application is related to Ser. No. 07/780,169, filed on even date herewith.

TECHNICAL FIELD

The present invention relates to a novel foaming soldering flux used in automatic soldering processes.

BACKGROUND ART

Most fluxes and defluxing chemicals used by industry to manufacture electronic circuits, such as military hardware, are either contributing to ozone depletion of the atmosphere or are considered by local environmental agencies, such as the Air Quality Management District in the Los Angeles basin, as environmental pollutants or health hazards. For example, it has been reported that if CFCs (chlorofluorohydrocarbons), which are used in vapor degreasing to clean soldered parts where a rosin flux is employed, are released to the atmosphere, they will remain there as an ozone depletant for nearly 100 years. Other chemicals such as rosin fluxes, alcohols, and the like pose health risks and disposal problems for industry.

Water-soluble fluxes could be the simple solution for this major problem. However, most water-soluble fluxes are formulated with harsh activators, such as hydrochloric acid and complex glycols, which create major cleaning and residue problems for the printed circuit board and the electrical circuitry thereon and which tend to severely corrode the metal being soldered or contaminate the dielectric, causing a tendency for electromigration. Other water-soluble fluxes are formulated with iso-propanol and/or plasticizers, which create disposal and health problems.

What is desired is a simple, non-toxic, non-corrosive foaming soldering flux that produces solder joints of high metallic luster and excellent quality when used in automatic soldering processes.

DISCLOSURE OF INVENTION

In accordance with the invention, a foaming soldering flux is provided, comprising at least one water-soluble organic acid having at least two carboxylic groups, water, and at least one foaming agent. The flux of the invention produces, through aeration, a continuous head of foam which permits automatic soldering using a water-based flux in lieu of glycol/alcohol type liquid fluxes normally found in commercial fluxes. As a result of the unique formulation, automatic soldering can be performed, utilizing an environmentally safe, water-based flux. Further, this flux negates the need for costly and environmentally-harmful defluxing solvents, comprising chlorofluorocarbons and/or volatile organic compounds (VOCs). The flux is readily removed from soldered circuit card assemblies, using water and a surfactant. The resulting soldered joint exhibits high metallic luster and excellent electrical quality.

BRIEF DESCRIPTION OF THE DRAWINGS

FIG. 1 is a perspective view, partially exploded, showing a conventional foam fluxing system;

FIG. 2 is a cross-sectional view of the foam fluxing system of FIG. 1; and

BEST MODES FOR CARRYING OUT THE INVENTION

Figure 3:
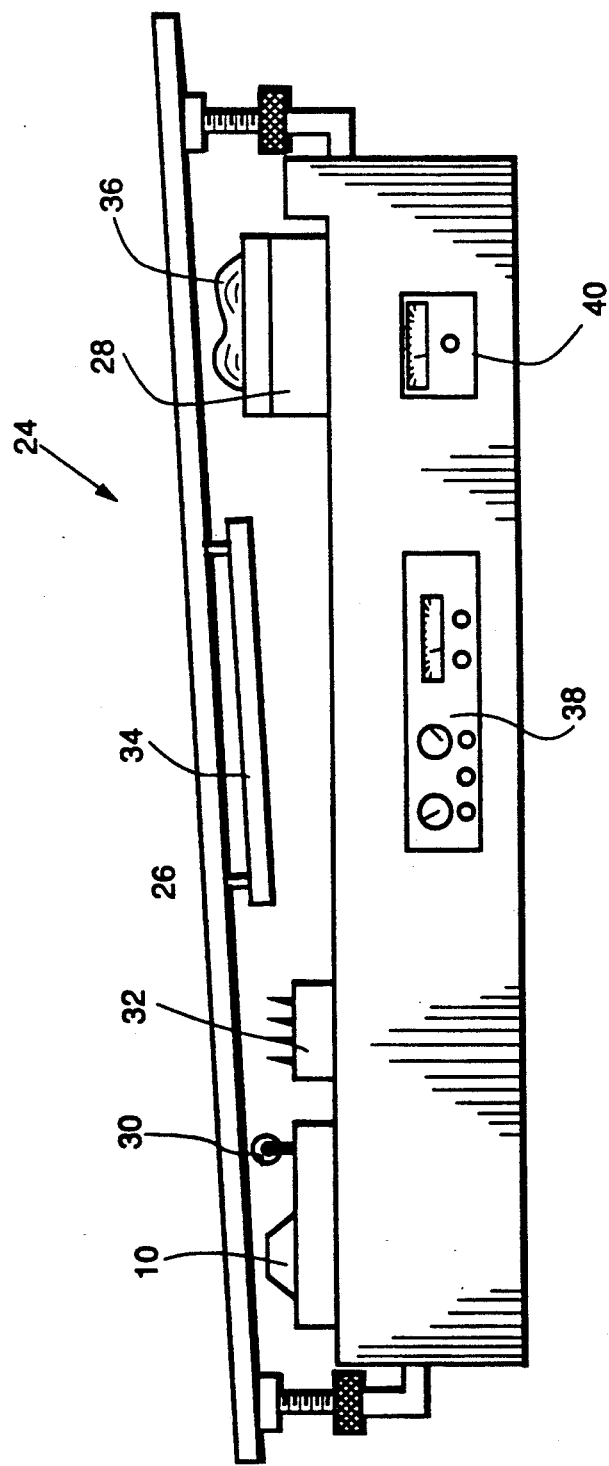
FIG. 3 is a side-elevational view of a conventional wave soldering system incorporating the foam fluxing system of FIGS. 1 and 2.

A conventional foam fluxing system 10 is illustrated in FIG. 1. An outer housing, or flux tank, 12 contains liquid flux 14 (visible in FIG. 2). An aerating stone 16 is situated in a flux chimney 18, which in turn is arranged in the flux tank 12 so as to permit the liquid flux in the flux tank to constantly flow into the flux chimney as required. An air connect 20, connected to a source of air (not shown) and pressurized to a controlled pressure by control means (not shown), provides aeration of the liquid flux, as seen more clearly in FIG. 2, to provide a foam head 22. It is desirable for the height of the foam head 22 to extend above the top 18a of the flux chimney 18. Desirably, when used in conjunction with the wave soldering system depicted in FIG. 3, the height of the foam head 22 is about 0.5 inch, shown at "A". However, for other soldering systems, that height may differ.

The primary factors governing the height of the foam head 22 include the composition of the foaming agent(s) used in the foaming flux, the concentration of the foaming agent(s), the air pressure applied to the aerating stone, and the physical structure of the stone itself.

The flux of the invention comprises (a) at least one water-soluble organic acid having at least two carboxylic acid groups citric acid, (b) water, and (c) at least one foaming agent.

Examples of suitable organic acids include citric acid, malic acid, tartaric acid, glutamic acid, phthalic acid, and the like. However, the best results have been obtained with citric acid, and while the class of organic acids indicated above is useful, the remainder of the description which follows is directed to the use of an aqueous solution of citric acid as a solder flux in foam soldering.

Without subscribing to any particular theory, it appears that the citric acid chelates the oxide, but not the basis metal. As a result, there is little or no corrosion of the basis metal by the flux of the invention. Thus, to the extent that members of the above class of organic acids behaves similarly to citric acid, then such members are also included within the ambit of the invention.

The concentration range of citric acid in water may range from about 0.5 to 99.5 percent (by weight). A concentration of at least about 5 wt % provides noticeably improved soldering results, while concentrations above about 50 wt % provide no additional improvement, and accordingly, this range is preferred. A concentration of at least about 20 wt % ensures consistently improved soldering results, even for less-than-ideal soldering surfaces, and accordingly, the range of about 20 to 50 wt % is most preferred.

The quality of water used and the grade of citric acid employed are not material in the practice of the invention, although for extremely sensitive electrical circuits, it may be desirable to employ distilled or deionized water and a fairly high grade of citric acid. The higher the grade of water and citric acid, the better the results.

The source of the citric acid is also immaterial, consistent with the foregoing considerations relating to sensitive electrical circuits, and may comprise, for example, commercially-produced powder or crystal or even fruit juice or fruit juice concentrate, such as juice from oranges, lemons, limes, grapefruits, pineapples, tomatoes, and the like. Finally, the flux may contain other components, such as impurities, whether accidental or deliberate, so long as such additives have no adverse effect on the soldering results.

The concentration of the foaming agent ranges from about 0.0001 to 5 wt %, depending on the particular foaming agent or combination of foaming agents selected. Preferably, the concentration ranges from about 0.0002 to 0.04 wt %.

The composition and concentration of the foaming agent must be selected so as to provide a foam head height of about 0.5 inch. If the concentration is too high, there will be too much foam, and the foam height will be too high; if the concentration is too low, there will not be enough foam to form the foam head 22.

Foaming agents suitably employed in the practice of the invention are selected from anionic, non-ionic, cationic, and amphoteric surfactants. Examples of anionic surfactants include sulfates, such as lauryl sulfate and lauryl ether sulfate, and the sodium and ammonium salts thereof; sulfonates, such as dodecyl benzene sulfonate, α-olefin sulfonates, xylene sulfonate, and the sodium, ammonium, and potassium salts thereof; and sarcosinates, such as lauryl sarcosinate, and the sodium, ammonium, and potassium salts thereof. Examples of non-ionic surfactants include nonyl phenol ethoxylates having about 6 to 30 moles ethoxylation; octyl phenol ethoxylates having about 4.5 to 30 moles ethoxylation; linear alcohol ethoxylates having about 6 to 30 moles ethoxylation; amides, such as coconut and lauric based; amine oxides, such as coconut, lauric, amido propyl, and alkyl dimethyl based; silicone glycol copolymers, and phosphate esters. Examples of cationic surfactants include quaternary ammonium compounds, such as alkyl dimethyl benzyl ammonium chloride. Examples of amphoteric surfactants include imidazolines, such as coconut and lauric based; and betaines, such as cocoamido and sulfo based.

Preferred examples of foaming agents and concentrations suitably employed in the practice of the invention include (a) sodium alkyl sulfonate, which may range from about 0.0315 to 0.0385 wt %, and preferably is about 0.035 wt %; (b) polyoxyalkylene glycol, which may range from about 0.0018 to 0.003 wt %, and preferably is about 0.0024 wt %; (c) octyl phenoxy polyethoxy ethanol, which may range from about 0.0030 to 0.0043 wt %, and preferably is about 0.0036 wt %; and (d) ethoxylated alcohol, which may range from about 0.0024 to 0.0037 wt % and preferably is about 0.0030 wt %. An especially preferred combination of foaming agents comprises about 0.0022 to 0.0032 wt %, and preferably about 0.0027 wt %, sodium 1-octane sulfonate, about 0.0020 to 0.0030 wt %, and preferably about 0.0025 wt %, N-octyl-2-pyrrolidone, and about 0.0002 to 0.0004 wt %, preferably about 0.0003 wt %, fluoroalkyl sulfonate.

Additives may be added to the flux for specific purposes. For example, an odorant, such as wintergreen oil, spearmint oil, or peppermint oil, may be added to the flux to provide a pleasant odor for the user. Such an odorant is typically added in the amount of about 1 to 30 ppm.

A colorant may be added for visual purposes; this enables the operator to see the flux, which is otherwise colorless. About 1 to 30 ppm of at least one coloring agent (or acid-stable, non-photoreactive dye) may be added in this regard.

The flux is most advantageously employed in the soldering of electrical connections of electronic components to printed circuit boards (PCBs). Such printed circuit boards typically comprise copper-plated lines surrounding via openings, which are copper-plated followed by a tin-lead coating over the copper, in the PCB through which the leads of the components extend. The solder employed during component soldering is typically a tin-lead solder, and the flux of the invention has been successfully used with 60-40, 63-37, and 96-4 tin-lead solders. In most applications, 63-37 tin-lead solder is employed.

FIG. 3 depicts apparatus 24 commonly used to solder printed circuit boards, employing wave soldering. The apparatus is seen to include a transporter rail 26 which carries the printed circuit boards (not shown) at the desired height above the foam fluxing unit 10 and the solder wave unit 28. After passing over the foam fluxing unit 10, the PCB is exposed to a flux air knife 30 to blow off excess flux from the PCB assembly, an optional auxiliary heater 32, and a preheater 34 to heat the board to condition the flux and reduce thermal shock to the board and components thereon, before contact with the solder wave 36. Various aspects of the operation are controlled from a control panel 38. The temperature of the solder in the solder pot 28 is also controlled by temperature controller 40.

While the flux of the invention is specifically intended for use in foaming operations, such as used in automated soldering processes described above, the flux may also be applied by a variety of techniques, such as wave, spray, or dipping techniques.

The flux of this invention was formulated to produce a rapid movement of flux foam that could rise up through the fluxing chimney 18 with sufficient force to produce a head of flux foam 22 0.5 inch or more of free height (rapid movement of foam through a narrow rectangular opening rising above the top chimney surface 18a), and as the foam descends, it must result in a timely collapse of the foam bubbles sufficient to prevent the flux foam from collecting and flowing outside the flux holding pan 12 (which houses the flux 14, fluxing chimney 18, and aeration stone 16). Such timely collapse is substantially immediately, and is referred to as "fast-breaking". Surprisingly, while fast-breaking foam is known in solvent-based fluxes, such foam is not generally known in aqueous-based fluxes.

The foaming flux is easily removed using an aqueous cleaning system, which may contain surfactants to enhance cleaning, if desired. Non-ionic wetting agents, such as ethoxylated alcohol, available under the tradename Triton X-100 from Rohm & Haas (Los Angeles, Calif.), may be added up to about 0.1 wt % of the cleaning solution.

The degree of cleanness and the need for a surfactant is somewhat dependent upon user cleanness requirements. Using an ethoxylated alcohol, such as Triton X-100, in an amount of about 0.007 wt % in water provides a cleanness of between about 7.5 and 20 megohm/cm, as measured by an Omega meter, model 200 (available from Kenco Industries, Inc., Atlanta, Ga.). These values are not per se critical, but are guidelines to meet military specifications for cleanness requirements for this particular testing system.

This water-based soldering flux produces a good head of fluxing foam without any noticeable decomposition following weeks of use. The flux of this invention avoids the use of such components as glycols, alcohols, or other volatile organic compounds (VOCs) normally found in commercially available liquid fluxes.

The flux of the invention provides the following advantages:

1. It eliminates harmful environmental emissions normally associated with rosin-based fluxes, flux thinner (such as iso-propyl alcohol), and associated defluxing agents (such as 1,1,1-trichloroethane). Indeed, cleaning of the flux is simply done in warm or hot water and a surfactant (if needed). Thus, the new flux is environmentally safe.

2. It provides soldering personnel with a non-toxic, extremely safe, and highly effective flux to use.

3. Its use cuts the actual soldering time by approximately 50%. This enables automated soldering, using foam flux soldering, to proceed at a rate normally twice as fast as with rosin-based fluxes, thereby subjecting electronic components to the heat of the solder for a far shorter period of time.

4. Wave soldered assemblies can be cleaned in deionized water, thus eliminating the high capital cost of vapor degreasing equipment. The recurring costs of defluxing solvents and the costs associated with redistillation are also eliminated.

5. Since use of the flux of the invention eliminates degreasing, the total cleaning time is reduced by about ten to fifteen minutes.

6. Use of the flux of the invention eliminates the need for costly control of solvent usage and equipment permits required by local environmental agencies (such as AQMD in the Los Angeles basin).

7. Use of the flux significantly reduces waste disposal and waste management costs; the flux is biodegradable and water soluble.

8. Use of the flux of the invention provides solder joints that evidence high metallic luster and excellent electrical quality.

INDUSTRIAL APPLICABILITY

The solder flux of the invention is expected to find use in commercial and military foaming automatic soldering operations, particularly in soldering electrical components in circuit boards.

EXAMPLES

Example 1

A base flux solution was prepared consisting essentially of 46 wt % citric acid granules in water. To this solution was added the following foaming agents: 0.00274 wt % sodium 1-octane sulfonate, 0.00249 wt % N-octyl-2-pyrrolidone, and 0.00032 wt % fluoroalkyl sulfonate (sodium salt).

Example 2

The base flux solution was prepared as in Example 1. To this solution was added the following foaming agent: 0.035 wt % sodium alkyl sulfonate.

Example 3

The base flux solution was prepared as in Example 1. To this solution was added the following foaming agent: 0.0024 wt % polyoxyalkylene glycol.

Example 4

The base flux solution was prepared as in Example 1. To this solution was added the following foaming agent: 0.0036 wt % octyl phenoxy polyethoxy ethanol.

Example 5

The base flux solution was prepared as in Example 1. To this solution was added the following foaming agent: 0.0030 wt % ethoxylated alcohol.

Example 6

The fluxes prepared in Examples 1-5 were evaluated in terms of foam height, foam bubble breaking status, longevity, and cleanness level. The results are tabulated in Table I below.

TABLE I

| Foam Flux Evaluation Results. | | | | | |
| --- | --- | --- | --- | --- | --- |
| Example | Foam Height | Bubble Breaking Status | Longevity (days) | Cleanness Acceptance* | Performance** |
| 1 | $\geq 0.5''$ | small, fast-breaking bubbles | $\geq 7$ | passed | 1 |
| 2 | $\geq 0.5''$ | small, fast-breaking bubbles | $\geq 5$ | passed | 2 |
| 3 | $\geq 0.5''$ | small, slow-breaking bubbles | $\leq 3$ | passed | 3 |
| 4 | $\geq 0.5''$ | medium, slow-breaking bubbles | $\leq 2$ | failed | 5 |
| 5 | $\geq 0.5''$ | large, slow-breaking bubbles | $\leq 2$ | passed | 4 |

*Acceptance range = 7.5-20 MΩ/cm (Omega Meter)
**1 = best

Example 7

A solder/flux spread test was performed to compare the soldering flux formulae with and without the foaming agent(s). (The soldering flux without the foaming agents is the subject of separate patent applications, listed above in the Cross-Reference to Related Applications.) The comparison was made to determine if the spread of solder was affected by the foaming additive(s). The flux formulations included the five formulations set forth in Examples 1-5 plus 46 wt % citric acid granules in water.

The test involved the placement of 0.060 inch diameter 60/40 solid solder wire rings (⅜ inch inside diameter) onto a copper panel (approx. 2×2.5×0.060 inches). Three drops of flux were placed in the center of each ring. The copper specimens were then heated on a hot plate above the melt temperature of the solder. The specimens were removed from heat at the point of solder liquefaction, cleaned, and visually examined.

The solder spread of each of the foam flux formulations of Examples 1-5 was comparable with the citric acid flux without foam additives.

Thus, there has been disclosed a non-toxic, non-corrosive foam soldering flux, suitable for use in soldering electrical components. It will be clear to those skilled in the art that various changes and modifications of an obvious nature may be made, and all such changes and modifications are considered to fall within the scope of the invention, as defined by the appended claims.

What is claimed is:

1. A method for soldering a metal comprising applying to a surface a foaming soldering flux, heating said metal to a desired soldering temperature, and applying solder to said surface, said soldering flux comprising (a) a water-soluble organic acid having at least two carboxylic acid groups, (b) water, and (c) at least one foaming agent, the concentration of which is sufficient to generate a foam head height of at least about 0.5 inch for automated wave soldering processes and to collapse rapidly to avoid accumulation of foam.

2. The method of claim 1 wherein said surface is copper or tinned copper and said solder is a tin-lead solder.

3. The method of claim 1 wherein said organic acid is selected from the group consisting of citric acid, malic acid, tartaric acid, glutamic acid, and phthalic acid.

4. The method of claim 3 wherein said organic acid consists essentially of citric acid.

5. The method of claim 4 wherein the concentration of said citric acid ranges from about 0.5 to 99.5 wt %.

6. The method of claim 5 wherein the concentration of citric acid is at least about 5 wt %.

7. The method of claim 6 wherein said concentration of citric acid ranges from about 20 to 50 wt %.

8. The method of claim 1 wherein said concentration of said at least one foaming agent ranges from about 0.0001 to 5.0 wt %.

9. The method of claim 8, wherein said at least one foaming agent is selected from the group consisting of sulfates, sulfonates, sarcosinates, nonyl phenol ethoxylates having about 6 to 30 moles ethoxylation, octyl phenol ethoxylates having about 4.5 to 30 moles ethoxylation, linear alcohol ethoxylates having about 6 to 30 moles ethoxylation, amides, amine oxides, silicone glycol copolymers, phosphate esters, quaternary ammonium compounds, imidazolines, and betaines.

10. The method of claim 9, wherein said at least one foaming agent is selected from the group consisting of sodium 1-octane sulfonate, N-octyl-2-pyrrolidone, fluoroalkyl sulfonate, sodium alkyl sulfonate, polyoxyalkylene glycol, octyl phenoxy polyethoxy ethanol, and ethoxylated alcohol.

11. The method of claim 10, wherein said at least one foaming agent is selected from the group consisting of (a) about 0.0315 to 0.0385 wt % sodium alkyl sulfonate; (b) about 0.0018 to 0.003 wt % polyoxyalkylene glycol; (c) about 0.0030 to 0.0043 wt % octyl phenoxy polyethoxy ethanol; and (d) about 0.0024 to 0.0037 wt % ethoxylated alcohol.

12. The method of claim 11, wherein said at least one foaming agent is selected from the group consisting of (a) about 0.035 wt % sodium alkyl sulfonate; (b) about 0.0024 wt % polyoxyalkylene glycol; (c) about 0.0036 wt % octyl phenoxy polyethoxy ethanol; and (d) about 0.0030 wt % ethoxylated alcohol.

13. A non-corrosive, non-toxic, rosin-free foaming solder flux composition, characterized in that said soldering flux composition comprises (a) a water-soluble organic acid having at least two carboxylic acid groups, (b) water, and (c) at least one foaming agent, the concentration of which is sufficient to generate a foam head height of at least about 0.5 inch for automated wave soldering processes and to collapse rapidly to avoid accumulation of foam.

14. The flux composition of claim 13 wherein said organic acid is selected from the group consisting of citric acid, malic acid, tartaric acid, glutamic acid, and phthalic acid.

15. The flux composition of claim 14 wherein said organic acid consists essentially of citric acid.

16. The flux composition of claim 15 wherein said citric acid ranges from about 0.5 to 99.5 wt %.

17. The flux composition of claim 16 wherein said citric acid is present in an amount of at least about 5 wt %.

18. The flux composition of claim 17 wherein said citric acid is present in an amount ranging from about 20 to 50 wt %.

19. The flux composition of claim 14 wherein said concentration of said at least one foaming agent ranges from about 0.0001 to 5.0 wt %.

20. The flux composition of claim 19, wherein said at least one foaming agent is selected from the group consisting of sulfates, sulfonates, sarcosinates, nonyl phenol ethoxylates having about 6 to 30 moles ethoxylation, octyl phenol ethoxylates having about 4.5 to 30 moles ethoxylation, linear alcohol ethoxylates having about 6 to 30 moles ethoxylation, amides, amine oxides, silicone glycol copolymers, phosphate esters, quaternary ammonium compounds, imidazolines, and betaines.

21. The flux composition of claim 20, wherein said at least one foaming agent is selected from the group consisting of sodium 1-octane sulfonate, N-octyl-2-pyrrolidone, fluoroalkyl sulfonate, sodium alkyl sulfonate, polyoxyalkylene glycol, octyl phenoxy polyethoxy ethanol, and ethoxylated alcohol.

22. The flux composition of claim 21, wherein said at least one foaming agent is selected from the group consisting of (a) about 0.0315 to 0.0385 wt % sodium alkyl sulfonate; (b) about 0.0018 to 0.003 wt % polyoxyalkylene glycol; (c) about 0.0030 to 0.0043 wt % octyl phenoxy polyethoxy ethanol; and (d) about 0.0024 to 0.0037 wt % ethoxylated alcohol.

23. The flux composition of claim 22, wherein said at least one foaming agent is selected from the group consisting of (a) about 0.035 wt % sodium alkyl sulfonate; (b) about 0.0024 wt % polyoxyalkylene glycol; (c) about 0.0036 wt % octyl phenoxy polyethoxy ethanol; and (d) about 0.0030 wt % ethoxylated alcohol.

24. A method for soldering a metal comprising applying to a surface a foaming soldering flux, heating said metal to a desired soldering temperature, and applying solder to said surface, said soldering flux comprising (a) at least about 5 wt % citric acid, (b) water, and (c) at least one foaming agent.

25. The method of claim 24 wherein said surface is copper or tinned copper and said solder is a tin-lead solder.

26. The method of claim 24 wherein said concentration of citric acid ranges from about 20 to 50 wt %.

27. The method of claim 24 wherein the concentration of said least one foaming agent is sufficient to generate a foam head height of at least about 0.5 inch for automated wave soldering processes and to collapse rapidly to avoid accumulation of foam.

28. The method of claim 27 wherein said concentration of said at least one foaming agent ranges from about 0.0001 to 5.0 wt %.

29. The method of claim 28, wherein said at least one foaming agent is selected from the group consisting of sulfates, sulfonates, sarcosinates, nonyl phenol ethoxylates having about 6 to 30 moles ethoxylation, octyl phenol ethoxylates having about 4.5 to 30 moles ethoxylation, linear alcohol ethoxylates having about 6 to 30 moles ethoylation, amides, amine oxides, silicone glycol copolymers, phosphate esters, quaternary ammonium compounds, imidazolines, and betaines.

30. The method of claim 29, wherein said at least one foaming agent is selected from the group consisting of sodium 1-octane sulfonate, N-octyl-2-pyrrolidone, fluoroalkyl sulfonate, sodium alkyl sulfonate, polyoxyalkylene glycol, octyl phenoxy polyethoxy ethanol, and ethoxylated alcohol.

31. The method of claim 30, wherein said at least one foaming agent is selected from the group consisting of (a) about 0.0315 to 0.0385 wt % sodium alkyl sulfonate; (b) about 0.0018 to 0.003 wt % polyoxyalkylene glycol; (c) about 0.0030 to 0.0043 wt % octyl phenoxy polyethoxy ethanol; and (d) about 0.0024 to 0.0037 wt % ethoxylated alcohol.

32. The method of claim 31, wherein said at least one foaming agent is selected from the group consisting of (a) about 0.0035 wt % sodium alkyl sulfonate; (b) about 0.0024 wt % polyoxyalkylene glycol; (c) about 0.0036 wt % octyl phenoxy polyethoxy ethanol; and (d) about 0.0030 wt % ethoxylated alcohol.

33. A non-corrosive, non-toxic, rosin-free foaming solder flux composition, characterized in that said soldering flux composition comprises (a) at least about 5 wt % citric acid, (b) water, and (c) at least one foaming agent.

34. The flux composition of claim 33 wherein said citric acid is present in an amount ranging from about 20 to 50 wt %.

35. The flux composition of claim 33 wherein the concentration of said at least one foaming agent is sufficient to generate a foam head height of at least about 0.5 inch for automated wave soldering processes and to collapse rapidly to avoid accumulation of foam.

36. The flux composition of claim 35 wherein said concentration of said at least one foaming agent ranges from about 0.0001 to 5.0 wt %.

37. The flux composition of claim 36, wherein said at least one foaming agent is selected from the group consisting of sulfates, sulfonates, sarcosinates, nonyl phenol ethoxylates having about 6 to 30 moles ethoxylation, octyl phenol ethoxylates having about 4.5 to 30 moles ethoxylation, linear alcohol ethoxylates having about 6 to 30 moles ethoxylation, amides, amine oxides, silicone glycol copolymers, phosphate esters, quaternary ammonium compounds, imidazolines, and betaines.

38. The flux composition of claim 37, wherein said at least one foaming agent is selected from the group consisting of sodium 1-octane sulfonate, N-octyl-2-pyrrolidone, fluoroalkyl sulfonate, sodium alkyl sulfonate, polyoxyalkylene glycol, octyl phenoxy polyethoxy ethanol, and ethoxylated alcohol.

39. The flux composition of claim 38, wherein said at least one foaming agent is selected from the group consisting of (a) about 0.0315 to 0.0385 wt % sodium alkyl sulfonate; (b) about 0.0018 to 0.003 wt % polyoxyalkylene glycol; (c) about 0.0030 to 0.0043 wt % octyl phenoxy polyethoxy ethanol; and (d) about 0.0024 to 0.0037 wt % ethoxylated alcohol.

40. The flux composition of claim 39, wherein said at least one foaming agent is selected from the group consisting of (a) about 0.035 wt % sodium alkyl sulfonate; (b) about 0.0024 wt % polyoxyalkylene glycol; (c) about 0.0036 wt % octyl phenoxy polyethoxy ethanol; and (d) about 0.0030 wt % ethoxylated alcohol.

* * * * *